March 30, 1965        J. M. BRINKERHOFF              3,176,130
                    NARROW BAND X-RAY DETECTOR
Filed June 9, 1961                              2 Sheets-Sheet 1

INVENTOR.
JORIS M. BRINKERHOFF
BY
ATTORNEY

3,176,130
NARROW BAND X-RAY DETECTOR
Joris M. Brinkerhoff, Arlington, Mass., assignor, by mesne assignments, to Laboratory for Electronics, Inc., Boston, Mass., a corporation of Delaware
Filed June 9, 1961, Ser. No. 116,105
11 Claims. (Cl. 250—51.5)

This invention relates in general to the detection of X-rays and gamma rays and, more particularly, to a detector providing an exceptionally narrow band response for selected energies of X-rays and gamma rays.

X-ray and gamma ray detectors providing a substantial response only to preselected narrow ranges of energy are useful in many applications of X-rays and gamma rays. Certainly one of the major applications for such detectors lies in the field of X-ray fluorescence analysis, in which the identification of elements is accomplished through the excitation and measurement of characteristic X-ray fluorescence radiation. Thus, each chemical element displays a principle characteristic fluorescence of very sharply defined energy value. In general, the usual X-ray and gamma ray detectors provide substantially the same response over fairly wide bands of energy. Hence, the background signal of these detectors is in general contributed to by fluorescent radiation of materials other than that of the particular one desired to be measured. The background will also consist of other unwanted radiation, such as scattered radiation (if X-ray excitation is used to excite the desired fluorescence) or bremsstrahlung (if electron excitation is used). If the response of the detector is limited to a narrow band of energies, particularly one selected to correspond to a particular fluorescence energy to be measured, then the background of the detector is greatly reduced and, hence, the sensitivity of the measurement system is enhanced. One method, which has been employed to provide such a narrow band response, is X-ray diffraction spectroscopy, in which the radiation to be measured is allowed to fall on a diffraction grating or reflection surface and the angle of scattering of this radiation off of the grating or reflection surface is characteristic of both the incident angle and the energy. There are two serious drawbacks to utilization of such a system. One drawback lies in the inherent delicacy of the mechanism itself, which is subject to variations in accuracy due to mechanical vibration and temperature effects. A second drawback lies in the inherently low efficiency of this method. This low efficiency arises from the fact that the energy of radiation can only be determined by knowing precisely the angle of incidence of the radiation and, hence, for isotropic sources, only a very small fraction of the radiation may be analyzed. In analytical studies of material, this latter deficiency requires that an X-ray generator producing a high radiation flux be used to excite the fluorescence lines of the material to be studied. Such a generator is not only expensive, but adds considerably to the complexity and bulk of the instrument.

Another type of detector which may be used to provide a narrow band response is the proportional counter. In the proportional counter, the pulse height output of the counter is generally proportional to the energy of the detected rays and, hence, electronic pulse height discrimination may be employed to provide an output equivalent to a selected input energy. In this method, one problem arises when measuring relatively high fluxes of radiation in that the proportional counter resolution is limited both by its own capacity and by the electronic discriminator circuits, and hence reasonable pulse height discrimination is only possible at relatively low radiation fluxes. Another problem arises from the nature of the proportional counter itself, in that there is a substantial dispersion in gain in the counter for incident rays of the same energy, and hence the energy resolution of the counter is limited.

While in the discussion above a typical example of the use of the application of a narrow band X-ray detector has been discussed, there are a great many possible applications of such a detector. Certainly in any attempt to utilize X-rays as a communication source, for example, the advantages of operating over selected narrow range of energies are apparent.

It is, therefore, a primary object of the present invention to provide an economic, efficient X-ray detector having substantial detection efficiency only between two narrowly separated and sharply defined energy limits.

It is another object of the present invention to provide an X-ray detector with inherently high efficiency which is substantially responsive only to X-rays falling within a preselected narrow range of energies.

It is still another object of the present invention to provide a narrow band energy responsive X-ray detector in which the energy response is not determined primarily by electronic discrimination.

Broadly speaking, the radiation detector of this invention exhibits an energy response characterized by having a high ratio of discrimination against energies lying outside of a selected pair of narrowly separated and sharply defined energy limits. This energy discrimination is achieved in the following manner: A filter plate of a selected material and a radiator plate of a different material are arranged with respect to an X-ray detector such that only X-rays which pass through the filter plate are incident upon the radiator plate and only rays which are either scattered from or originate in the radiator plate are incident upon the X-ray detector. The X-ray detector may be of any of the usual types, such as a scintillation detector, proportional counter, or ion chamber. The materials forming the filter and radiator plate are selected such that the X-ray absorption edge of the filter plate will be at a higher energy level than the X-ray absorption edge of the radiator plate, but that the energy of the characteristic X-radiation emitted by the filter plate will fall below the absorption edge of the radiator. Under these conditions, radiation above the absorption edge of the filter plate will be substantially absorbed by this plate which will, as a result, emit characteristic X-rays. These characteristic X-rays, falling below the absorption edge of the radiator, will pass through the radiator without significant interaction. X-rays of energies below the absorption edge of the radiator incident upon the filter plate will pass through both the filter plate and the radiator, since both materials will have a high coefficient of transmission for X-rays of this energy. X-rays, on the other hand, having an energy falling below the absorption edge of the filter plate but above the absorption edge of the radiator, will be readily transmitted by the filter and heavily absorbed in the radiator, resulting in characteristic X-rays being emitted by the radiator, which X-rays are detected by the X-ray detector. The bandwidth, then, of energy response is determined by the absorption edges of the two materials and, hence, will be narrow and sharply defined. If, in general, the materials are selected to differ from one another in atomic number by only one, the above criteria will be met. The energy range of the detector has, then, an upper limit defined by the absorption edge of the filter plate and a lower limit defined by the absorption edge of the radiator. Because of the large and discrete change of absorption factor at the absorption edge, a very small change in energy from above to below the absorption edge of the materials may result in a very high discrimination ratio of this detector against energies outside of the acceptable bandwidth. In some instances this discrimination ratio may be as high as 400 to 1.

It should be understood that X-rays having an energy of orders of magnitude higher (or lower) than the absorption edges of the materials concerned will also pass through the filter plate and, in some instances, will be Compton or Rayleigh scattered off of the radiator plate into the detector. However, in those instances where the range of energies of incident X-rays is sufficiently wide for this to occur, relatively crude electronic pulse height discrimination may be used to segregate out these much higher or lower energy rays.

Other objects and advantages will become apparent from the following detailed description when taken in conjunction with the accompanying drawing in which.

Figure 1:
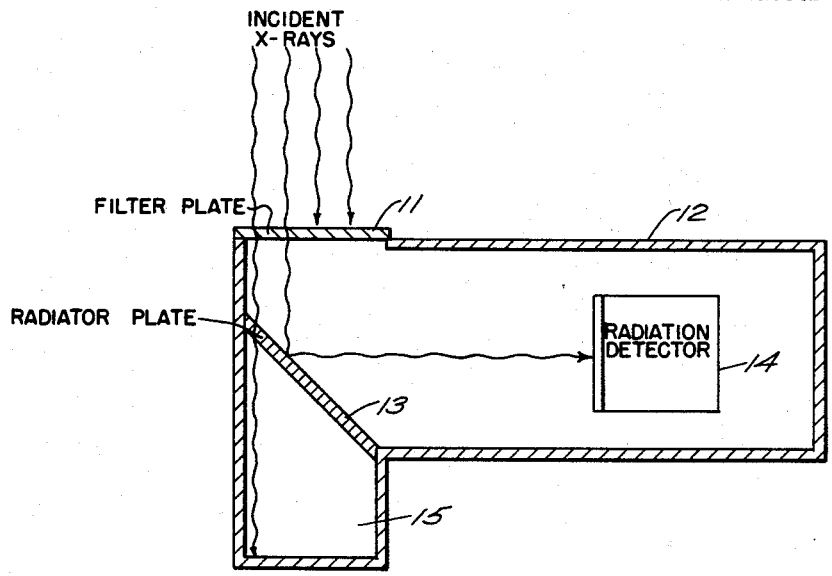
FIG. 1 is an illustration in diagrammatic form of the X-ray detection apparatus of this invention.

With reference now specifically to FIG. 1, the incident X-rays are seen to impinge upon the filter plate 11 which is formed as a window in an enclosing housing 12. The housing 12 is generally formed of radiation shielding material, while the filter plate 11, as will be described in more detail below, is transparent to radiations of particular energy. A radiator plate 13 is mounted at an angle with respect to the incident X-rays within the enclosure 12 behind filter plate 11. A radiation detector 14, which typically would be formed of a sodium iodide crystal and photomultiplier combination, is mounted within enclosure 12 to one side of filter plate 11, such that radiation from the filter plate is not directly incident upon the radiation detector 14. The radiator plate 14 is set at an angle such that radiation from it is impingent upon the radiation detector 14. A hollow chamber 15 extends behind radiator plate 13 and provides that X-rays transmitted through radiator plate 13 are not scattered back into radiation detector 14. The filter plate 11 is formed from material characterized by having an absorption edge corresponding to the upper limit of energies which are to be detected by the device. On the other hand, the radiator plate 13 is formed of a material having an absorption edge corresponding to the lower limit of energy of the X-rays to be detected. A further condition of the selection of materials of filter plate 11 and radiator 13 is that the characteristic radiation emitted by filter plate 11 upon excitation must be at an energy less than the absorption edge of radiator plate 13. These conditions can generally be met by forming the filter plate of a material having an atomic number one higher than the atomic number of the radiator plate, a typical example being a silver filter plate (atomic number 47) and a palladium radiator plate (atomic number 46). Radiations, then, having an energy in excess of the absorption edge of the filter plate 11 will be heavily absorbed by the filter plate, while radiations at an energy less than this will be readily transmitted by the filter plate. The filter plate will, in general, emit its characteristic radiation as a result of the photoelectric absorption of the higher energy rays so that the radiation which is incident upon the radiator plate 13 will consist of radiation at an energy less than the absorption edge of filter plate 11 and radiation of the characteristic energy of emission of filter plate 11. Of these components of radiation incident upon radiator plate 13, those having energies less than the absorption edge of radiator plate 13 will, in general, be transmitted readily through the radiator plate to be dissipated in chamber 15, while those having energies above the absorption edge of radiator plate 13 will be absorbed by this element and will result in characteristic radiation of radiator plate 13 being emitted. This latter radiation component (characteristic radiation from radiator plate 13) will be detected by radiation detector 14, which then will have an output related to that component of the incident X-rays having an energy lying between the two absorption edges. If the filter plate 11 is formed of silver, then the upper limit of the energy responsive range is 25.53 kev., and if the radiator plate is then formed of palladium, the lower limit is 24.35 kev. The characteristic radiation of silver is at an energy of 21.9 kev., and, hence, this combination meets the conditions prescribed above. The energy responsive bandwidth will then be 1.17 kev. at an average energy close to 25 kev.

When the incident beam of X-rays is a wide band of energies containing X-rays of an energy order of magnitude higher (or lower) than the absorption edges and, hence, the energy range to be measured, many of these higher or lower energy rays will be transmitted through the filter plate and, as a result of Compton or Rayleigh interactions with the radiator plate, will, in fact, give rise to pulses from the radiation detector 14. In a typical radiation detector, such as a scintillation counter or proportional counter, the pulse height attributable to these very high or low energy interactions will be considerably larger or smaller, respectively, than that for the energy interactions within the desired energy range. Hence, by applying a rough pulse height discrimination on the output detector, the pulses from the much higher or lower energy radiations may be eliminated from the final output.

Figure 2:
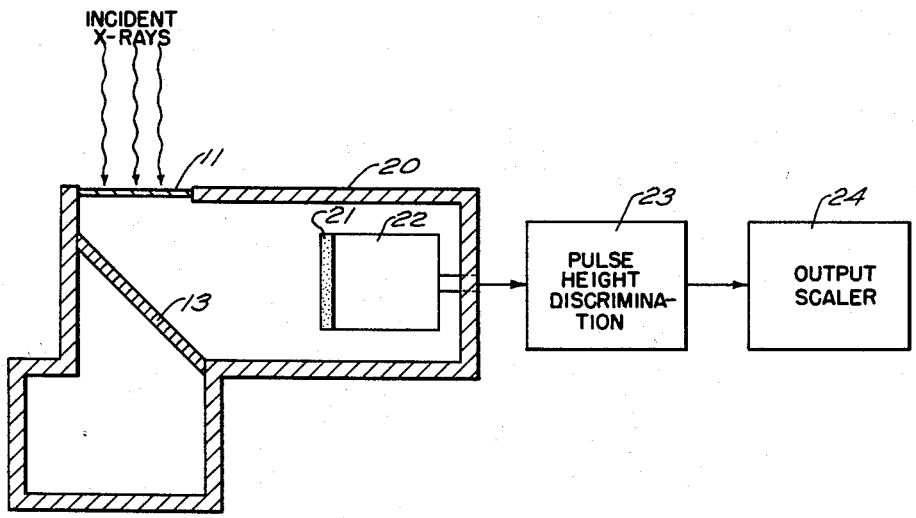
FIG. 2 is an illustration, partially in cross-sectional and partially in diagrammatic form, of an apparatus in accordance with the principles of this invention.

Turning now to FIG. 2, the detector is shown partly in cross-sectional view from above and partly in block diagrammatic form. Again, the incident X-rays are seen to impinge upon the filter plate 11 located as a window in the generally L-shaped enclosure 12 surrounded by heavy shielding walls 20. The radiator plate 13 is placed at an angle behind the filter plate 11 with the radiation detector in this instance shown as a sodium iodide crystal 21 with a photomultiplier 22, so positioned as to receive radiation only from radiator plate 13. The output of the photomultiplier scintillation combination is applied through pulse height discriminator 23 to output scaler 24. Thus, radiation of energies substantially higher (or lower) than the range of interest in the detector are eliminated by the action, as described above, of the pulse height discriminator 23, and the output scaler 24 records only those pulses corresponding to the energy range determined by the absorption edges of the filter and radiator plates. The pulse height discriminator 23 may be any typical electronic pulse height discriminator which accepts only pulses falling within a given range amplitude.

In the discussion above, reference has been made to the detector apparatus responding to X-rays within a certain energy range but not responding to energies outside of this range. Since the X-ray absorption and transmission characteristics of materials involve probabilities, then the above statement is not to be understood in an absolute sense. But, rather, it should be understood that the detector apparatus is highly sensitive to radiations within the preferred energy range while responding in a rather weak manner to radiations outside of this range. Typically, in an apparatus having a silver window and palladium radiator, the sensitivity to X-rays of energies within the absorption edge limits may be as high as 400 times the sensitivity to X-rays lying outside of these values. The exact value of this ratio will depend upon both the window thickness and the radiator thickness for any given pair of materials.

Figure 3:
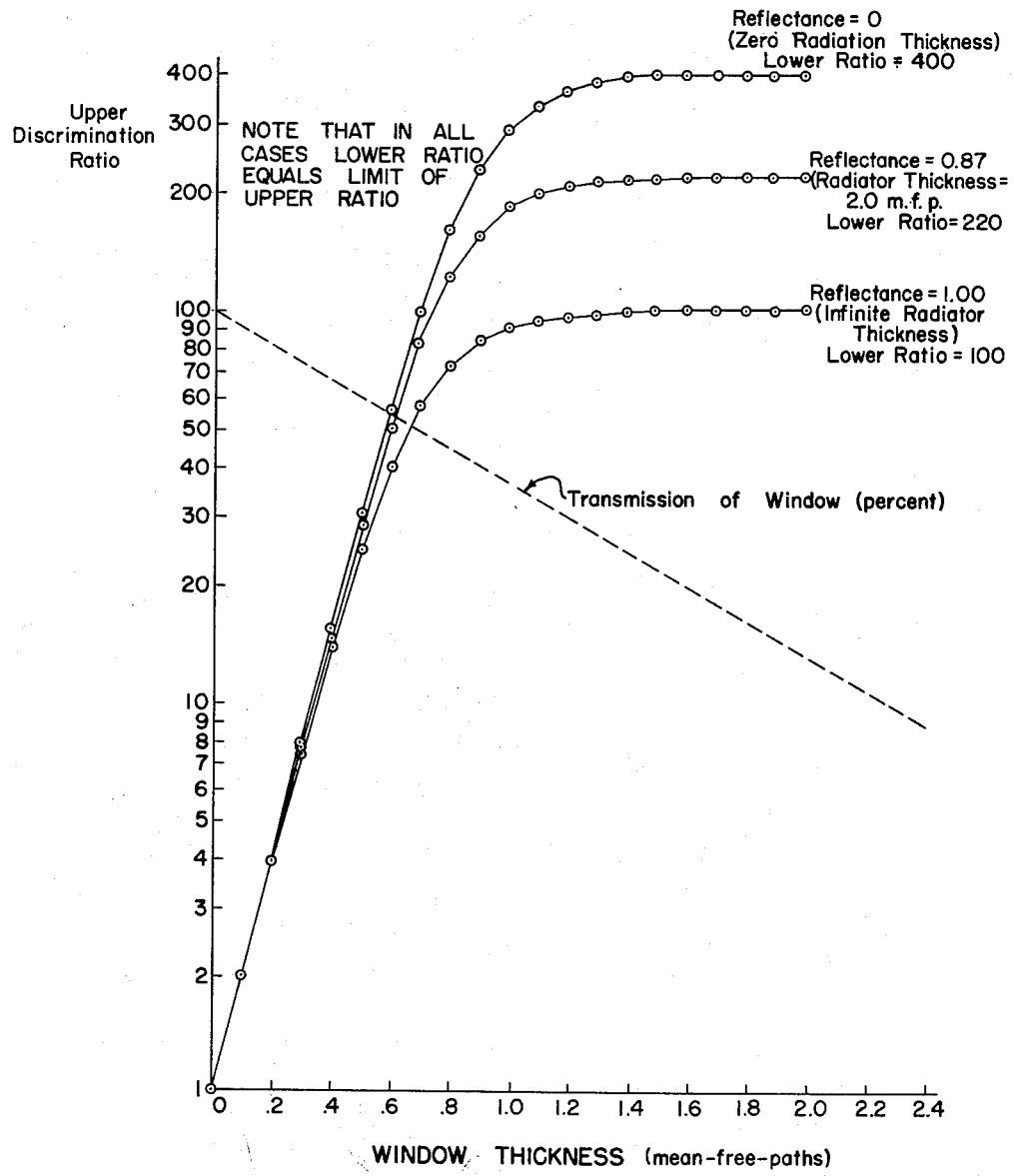
FIG. 3 is a graphical representation of upper and lower discrimination ratios as a function of filter and radiator thicknesses.

Referring now to FIG. 3, the dependence of the upper and lower discrimination ratios upon window thickness is shown for a silver and palladium combination. The upper ratio is defined as the ratio of efficiency of the detector to energies within the limits set by the two absorption edges as opposed to radiations of energies greater than the upper energy absorption edge. The lower ratio is defined as the ratio of efficiency of the detector to rays of energies within the absorption edges as compared to rays of energies less than the lower absorption edge limit. From the curves in FIG. 3, it can be seen that the maximum lower ratio is obtainable for zero radiator thickness and that this ratio decreases as the radiator thicknesses increase. This effect is attributable to the Compton and Rayleigh scattering.

It is also apparent that the maximum value of the upper discrimination ratio for given radiator thickness increases with increasing window thickness and, further, it is seen in all cases that the lower ratio has a value equal to the limit of the upper ratio, the latter being achieved at infinite filter thickness.

Again referring to FIG. 3, it is seen that substantially the maximum values of upper and lower ratios are achieved without undue sacrifice in efficiency. Thus, a transmission factor for the window, for example, of 30% and a radiator reflectance of 50% represent values sufficiently low for substantial realization of the ultimate discrimination factors obtainable. This relatively high efficiency permits, for example, the utilization of ordinary size radioactive sources, as opposed to X-ray machines, for X-ray fluorescence analysis.

While in the above discussion the cited materials have generally been a silver window and a palladium radiator, it is apparent that the same principles with apply to devices operating over a wide choice of materials, provided that the basic criteria are met. Thus, if a zinc filter material is used with a copper radiator, then the preferred energy range is between the 9.66 kev. absorption edge of zinc and the 8.98 absorption edge of copper, yielding a .680 kev. bandwidth. Since zinc has its characteristic emission at 8.5 kev., then the criterion of the filter plate emission energies lying below the radiator absorption edge is met. A suitable example for materials of high atomic number is found in tungsten (atomic number 74) and tantalum (atomic number 73). In this instance the acceptable energy range lies between 67.46 kev. and 69.51 kev., yielding an energy range of 2.05 kev. The tungsten characteristic emission lies at 58.3 kev. again well below the absorption edge of tantalum. While, in general, the optimum conditions in terms of narrow bandwidth are met by elements separated by only one atomic number, this is not the limiting characteristic. For example, if a silver (atomic number 47) filter plate is operated with a rhodium (atomic number 45) radiator element, then the energy band lies between 23.2 kev. and 25.5 kev. and since the characteristic emission of silver is 21.9 kev., it meets the criterion of being below the absorption edge of rhodium.

In the above cited examples, both a scintillation counter and a proportional counter were mentioned as preferred radiation detectors to be used in the apparatus. Any radiation detector will, however, be suitable and there are many other available types, such as silicon detectors, geiger mueller tubes, and the like. In order to operate the device with the additional factor of pulse height discrimination, the detector must, in these instances only, be of the type that provides an output pulse amplitude generally proportional to the energy of the incoming radiation particles.

In view of the fact that numerous modifications and departures may now be made by those skilled in this art, the invention herein is to be construed as limited only by the spirit and scope of the appended claims.

What is claimed is:

1. Apparatus for measurement of a selected energy range of an incident beam of X-rays comprising, a radiator element; an X-ray detector adapted to measure substantially only radiation from said radiator element; a filter plate interposed between said incident beam of X-rays and said radiator element, said radiator element being formed of a first material characterized by having its critical X-ray absorption edge at a first energy value equal to the lower limit of said selected energy range, said filter plate being formed of a second material characterized by having its critical X-ray absorption edge at an energy value equal to the upper limit of said selected energy range, said second material being further characterized by having its characteristic fluorescence X-ray emission energy at a value less than the X-ray absorption edge of said first material.

2. Apparatus for measurement of a selected energy range of an incident beam of X-rays comprising, a radiator element; an X-ray detector adapted to measure incident X-rays, said detector being positioned with respect to said radiator element such that only radiation from said radiator element is incident upon said detector; a filter plate interposed between said incident beam of X-rays and said radiator element, said radiator element being formed of a first material characterized by having its critical absorption edge at a first energy value equal to the lower limit of said selected energy band, said filter plate being formed of a second material characterized by having its critical X-ray absorption edge at an energy value equal to the upper limit of said selected energy band, said second material being further characterized by having its fluorescence X-ray emission energy at a value less than the X-ray absorption edge of said first material.

3. Apparatus for measurement of a selected energy range of incident beam of X-rays comprising a radiator element; an X-ray detector adapted to provide output pulses in response to incident X-rays, said detector being positioned with respect to said radiatior element such that only radiation from said radiator element is incident upon said detector; a filter plate interposed between said incident beam of X-rays and said radiator element, said radiator element being formed of a first material characterized by having its critical absorption edge at a first energy value equal to the lower limit of said selected energy band, said filter plate being formed of a second material characterized by having its critical X-ray absorption edge at an energy value equal to the upper limit of said selected energy band, said second material being further characterized by having its fluorescence X-ray emission energy at a value less than the X-ray absorption edge of said first material.

4. Apparatus for measurement of a selected energy range of an incident beam of X-rays comprising, a radiator element; an X-ray detector adapted to measure substantially only radiation from said radiator element; a filter plate interposed between said incident beam of X-rays and said radiator element, said radiator element being formed of a first material characterized by having its X-ray absorption edge at a first energy value equal to the lower limit of said selected energy band, said filter plate being formed of a second material characterized by having an atomic number equal to atomic number plus one of said radiator element material.

5. Apparatus in accordance with claim 3 wherein said radiation detector is a scintillation detector.

6. Apparatus for measurement of a selected energy range of an incident beam of X-rays comprising, a radiator element; an X-ray detector adapted to provide output pulses in response to radiation incident upon it, said output pulses having an amplitude related to the energy of said incident radiation, a filter plate interposed between said incident beam of X-rays and said radiator element, said X-ray detector being positioned such that only radiation from said radiator element is incident upon it, said radiator element being formed of a first material characterized by having its X-ray absorption critical edge at a first energy value equal to the lower limit of said selected energy band, said filter plate being formed of a second material being characterized by having its X-ray absorption edge at an energy value equal to the upper limit of said selected energy range, said second material being further characterized by having its characteristic fluorescence X-ray emission energy at a value less than the X-ray critical absorption edge of said first material; electronic pulse height discriminator means adapted to be operative on the output of said X-ray detector, said pulse height discriminator means being adapted to pass only pulses having an amplitude less than a predetermined value related to the upper limit of said selected energy range and greater than a predetermined value related to the lower limit of said selected energy range.

7. Apparatus in accordance with claim 6 wherein said X-ray detector is formed of a scintillation crystal and photomultiplier tube combination.

8. Apparatus for measurement of a selected energy range of an incident beam of X-rays comprising, a housing member, said housing member being formed of material generally opaque to said incident beam of X-rays, said housing member having an opening therein; a filter plate mounted in said opening in said housing member thereby forming a window in said housing member; said housing member being positioned such that said filter plate intercepts a substantial portion of said beam of X-rays; and X-ray detector adapted to provide output pulses in response to incident X-rays, said X-ray detector being disposed within said housing in a position such that radiation from said filter plate is not incident upon it; a radiator element disposed within said housing member behind said filter plate and mounted at an angle with respect to the plane of said filter plate such that radiation from said radiator element is incident upon said X-ray detector, said radiator element being formed of a first material characterized by having its critical X-ray absorption edge at a first energy value equal to the lower limit of said selected energy range, said filter plate beam formed of a second material characterized by having its critical X-ray absorption edge at an energy value equal to the upper limit to said selected energy range, said second material being further characterized by having its characteristic fluorescence X-ray emission energy at a value less than the X-ray absorption edge of said first material.

9. Apparatus in accordance with claim 6 wherein said radiation detector is a proportional counter.

10. Apparatus is accordance with claim 1 wherein said filter plate is formed in such a manner that less than 25% of incident radiation within said energy range is absorbed by said filter plate.

11. Apparatus in accordance with claim 8 wherein said housing is formed with a cavity for absorption of X-rays behind said radiator element.

References Cited by the Examiner
UNITED STATES PATENTS

| | | |
|---|---|---|
| 2,998,524 | 8/61 | Friedman _____ 250—86 |
| 2,999,937 | 9/61 | Kohler. |
| 3,030,512 | 4/62 | Harker. |

OTHER REFERENCES

"X-Ray Photography by Means of Fluorescence X-Radiation," by Elmer Dershem, Journal of the Optical Society of America, vol. 29, No. 2, February 1939, pp. 41 and 42.

X-Ray Diffraction Procedures, H. P. Klug and L. E. Alexander, John Wiley & Sons, Inc., New York, 1954, pp. 100–108.

Elements of X-Ray Diffraction, B. D. Cullity, Addison-Wesley Pub. Co., Reading, Mass., 1956, par. 7–10, pages 211–213.

RALPH G. NILSON, *Primary Examiner.*